(12) United States Patent
Meyer et al.

(10) Patent No.: US 11,130,321 B2
(45) Date of Patent: Sep. 28, 2021

(54) MULTI-LAYER COMPOSITE MATERIAL CONTAINING SPECIAL COPOLYCARBONATES AS A MATRIX MATERIAL

(71) Applicant: Covestro Deutschland AG, Leverkusen (DE)

(72) Inventors: Alexander Meyer, Düsseldorf (DE); Thomas Grimm, Cologne (DE); Klaus Horn, Dormagen (DE); Timo Kuhlmann, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 114 days.

(21) Appl. No.: 16/306,252

(22) PCT Filed: May 31, 2017

(86) PCT No.: PCT/EP2017/063122
§ 371 (c)(1),
(2) Date: Nov. 30, 2018

(87) PCT Pub. No.: WO2017/207611
PCT Pub. Date: Dec. 7, 2017

(65) Prior Publication Data
US 2019/0232623 A1    Aug. 1, 2019

(30) Foreign Application Priority Data
Jun. 3, 2016  (EP) ..................... 16172989

(51) Int. Cl.
B32B 27/28    (2006.01)
B32B 5/12     (2006.01)
(Continued)

(52) U.S. Cl.
CPC .............. B32B 27/283 (2013.01); B32B 5/12 (2013.01); B32B 27/365 (2013.01);
(Continued)

(58) Field of Classification Search
CPC ........ C08L 83/10; C08L 69/00; C08L 69/005; C08K 7/14; C08K 3/40; C08G 77/448;
(Continued)

(56) References Cited

U.S. PATENT DOCUMENTS 3,821,325 A    6/1974  Merritt, Jr. et al.
5,097,002 A    3/1992  Sakashita et al.
(Continued)

FOREIGN PATENT DOCUMENTS

DE        10311063 A1      9/2004
DE     102007011069 A1     9/2008
(Continued)

OTHER PUBLICATIONS

International Search Report for PCT/EP2017/063122 dated Jul. 7, 2017.
(Continued)

*Primary Examiner* — Camie S Thompson
(74) *Attorney, Agent, or Firm* — Faegre Drinker Biddle & Reath LLP

(57) ABSTRACT

The present invention relates to a composite material comprising one or more fibre layers of a fibre material, and a silicon-containing copolycarbonate as matrix material. The fibre layer(s) is/are embedded in the matrix material. The present invention further relates to a process for producing these composite materials and to the use thereof for production of construction or housing parts, and to the construction or housing parts themselves.

11 Claims, 4 Drawing Sheets

Figure 1:
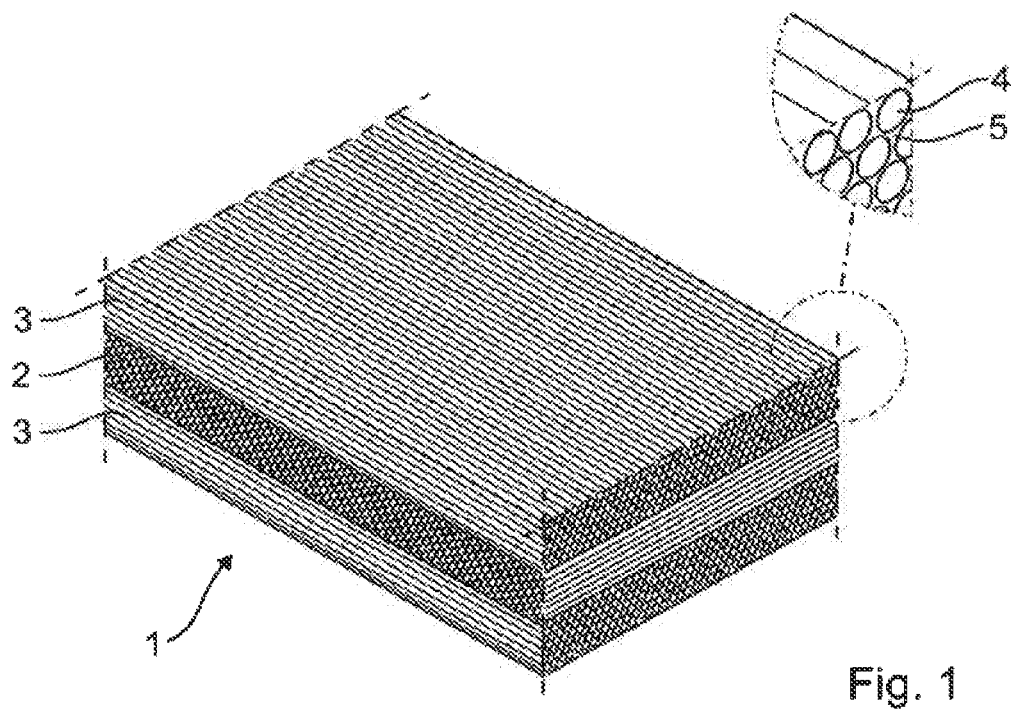

(51) Int. Cl.
*B32B 27/36* (2006.01)
*C08G 77/448* (2006.01)
*C08L 83/10* (2006.01)

(52) U.S. Cl.
CPC ............ *C08G 77/448* (2013.01); *C08L 83/10* (2013.01); *B32B 2260/021* (2013.01); *B32B 2260/046* (2013.01); *B32B 2262/101* (2013.01); *B32B 2262/106* (2013.01); *B32B 2270/00* (2013.01)

(58) Field of Classification Search
CPC ....... C08G 64/186; B32B 5/12; B32B 27/283; B32B 27/365; B32B 2262/101; B32B 2262/106; B32B 2260/021; B32B 5/02; B32B 5/10; B32B 27/08; B32B 2250/03; B32B 226/021; B32B 226/046; B32B 226/02; B32B 2262/10; B32B 2262/103; G03G 5/0564; G03G 5/0578
USPC ........ 428/299.1, 297.4, 299.4; 524/474, 464, 524/439; 521/91; 528/43, 33, 41; 264/311.11
See application file for complete search history.

(56) References Cited

U.S. PATENT DOCUMENTS

| | | | |
|---|---|---|---|
| 5,235,026 | A | 8/1993 | Wulff et al. |
| 5,288,778 | A | 2/1994 | Schmitter et al. |
| 5,340,905 | A | 8/1994 | Kühling et al. |
| 5,717,057 | A | 2/1998 | Sakashita et al. |
| 5,821,380 | A | 10/1998 | Holderbaum et al. |
| 5,883,165 | A | 3/1999 | Kröhnke et al. |
| 6,066,700 | A * | 5/2000 | Konig .................. C08G 64/186 525/464 |
| 6,596,840 | B1 | 7/2003 | Kratschmer et al. |
| 6,740,730 | B1 | 5/2004 | Kratschmer et al. |
| 7,071,284 | B2 | 7/2006 | Kauth et al. |
| 8,044,122 | B2 | 10/2011 | Ruediger et al. |
| 8,158,745 | B2 | 4/2012 | Wehrmann et al. |
| 9,334,607 | B2 | 5/2016 | Börger |
| 2011/0020572 | A1 | 1/2011 | Malek et al. |
| 2013/0267665 | A1 | 10/2013 | Huggins et al. |
| 2014/0018491 | A1 | 1/2014 | Moniruzzaman |
| 2014/0051310 | A1* | 2/2014 | Kunal .................. B32B 27/285 442/1 |
| 2015/0197632 | A1* | 7/2015 | van der Mee .......... C08L 69/00 524/537 |
| 2015/0197633 | A1 | 7/2015 | van der Mee et al. |
| 2015/0344687 | A1* | 12/2015 | Van Zyl ................ C08L 69/005 428/220 |
| 2016/0137817 | A1 | 5/2016 | Endtner et al. |
| 2016/0257794 | A1 | 9/2016 | Grimm et al. |

FOREIGN PATENT DOCUMENTS

| | | |
|---|---|---|
| DE | 102008019503 A1 | 10/2009 |
| DE | 102011005462 B3 | 6/2012 |
| EP | 0500496 A1 | 8/1992 |
| EP | 0517044 A2 | 12/1992 |
| EP | 0839623 A1 | 5/1998 |
| EP | 1308084 A1 | 5/2003 |
| EP | 2886305 A1 | 6/2015 |
| JP | 2013-107979 A | 6/2013 |
| JP | 2016-098376 A | 5/2016 |
| WO | 94/16003 A1 | 7/1994 |
| WO | WO-9615102 A2 | 5/1996 |
| WO | WO-0105866 A1 | 1/2001 |
| WO | WO-0105867 A1 | 1/2001 |
| WO | WO-2004063249 A1 | 7/2004 |
| WO | 2005/052059 A1 | 6/2005 |
| WO | WO-2011163365 A2 | 12/2011 |
| WO | 2012/123302 A1 | 9/2012 |
| WO | WO-2012126910 A1 | 9/2012 |
| WO | 2013/170456 A1 | 11/2013 |
| WO | WO-2013170452 A1 | 11/2013 |
| WO | WO-2014011414 A1 | 1/2014 |
| WO | WO-2014104655 A1 | 7/2014 |
| WO | 2014/136876 A1 | 9/2014 |
| WO | 2015/052113 A1 | 4/2015 |
| WO | WO-2015052110 A1 | 4/2015 |
| WO | WO-2015052114 A1 | 4/2015 |
| WO | 2015/065611 A1 | 5/2015 |
| WO | 2015/113916 A1 | 8/2015 |
| WO | WO-2015114427 A1 | 8/2015 |

OTHER PUBLICATIONS

Written Opinion of the International Searching Authority for PCT/EP2017/063122 dated Jul. 7, 2017.
International Preliminary Report on Patentability received for PCT Patent Application No. PCT/EP2017/063122, dated Dec. 13, 2018, 21 pages (12 pages of English Translation and 9 pages of Original Document).
Masaya Okamoto: "Impact resistance of fibrous glass reinforced plastics using polycarbonate-polydimethylsiloxane block copolymer", Journal of Applied Polymer Science vol. 86, 1123-1127, (Copyright)2002Wileyperiodicals, Inc, vol. 86, Feb. 5, 2002, pp. 1123-1127.

* cited by examiner

MULTI-LAYER COMPOSITE MATERIAL CONTAINING SPECIAL COPOLYCARBONATES AS A MATRIX MATERIAL

CROSS-REFERENCE TO RELATED APPLICATIONS

This application is a national stage application (under 35 U.S.C. § 371) of PCT/EP2017/063122, filed May 31, 2017, which claims benefit of European Application No. 16172989.2, filed Jun. 3, 2016, both of which are incorporated herein by reference in their entirety.

The present invention relates to a composite material comprising one or more fibre layers of a fibre material, and a silicon-containing copolycarbonate as matrix material. The fibre layer(s) is/are embedded in the matrix material. The present invention further relates to a process for producing these composite materials and to the use thereof for production of construction or housing parts, and to the construction or housing parts themselves.

Fibre-containing composite materials or multilayer composite materials having a matrix based on a thermoplastic polymer are referred to both hereinafter and in the prior art as "composite sheets" or "composite materials".

Compared to extruded plastics sheets without fibre reinforcement, composite sheets of this kind have higher strength and stiffness, and even attain or can actually exceed the strength and stiffness of metallic sheets. The importance of materials of this kind, for example as housing parts in the electronics and IT industry, but also in the automobile and aircraft industry, is increasing constantly. These composite materials have high stiffness with simultaneously excellent mechanical properties. Compared to conventional materials such as steel, they additionally have a distinct weight advantage.

Further fields of use of multilayer composite materials are in sectors where lightweight and load-bearing structures are required. As well as the automobile sector (for example tailgates, roof modules, door modules, crossmembers, frontend and back-end configurations, dash panels) and aircraft sector that have already been mentioned, these are the utility vehicle sector, the field of rail vehicles, and articles for everyday use, such as baby buggies, ski boots, skateboards, sports shoes and the like.

A further advantage of such polymer-supported composite materials is the risk of corrosion, which is reduced or eliminated entirely as a result of absence of steel.

It is known that multilayer composite materials can be made from fibre layers such as glass fibre layers or carbon fibre layers in combination with thermoplastic materials. Suitable thermoplastic substrate materials include a multitude of thermoplastics, such as polyethylene or polypropylene, polyamides, for example nylon-6, nylon-6,6, nylon-6, 12, polycarbonates, especially aromatic polycarbonates containing bisphenol A, thermoplastic polyurethanes, polyoxymethylene, polyphenylene ethers, styrene polymers, for example polystyrene and styrene-containing copolymers such as acrylonitrile-butadiene-styrene copolymers and styrene-acrylonitrile copolymers, polytetrafluoroethylene, polyaromatics, for example polyphenylene sulphide, polyether sulphone, polysulphone, polyether ether ketone, polyetheramide, polyacrylate or polyamide imide, polyquinoxalines, polyquinolines or polybenzimidazoles, polyesters such as polyethylene terephthalate or polybutylene terephthalate, polyacrylonitrile or polyvinyl compounds such as polyvinyl chloride, polyvinylidene chloride, polyvinyl esters, for example polyvinyl acetate, polyvinyl alcohols, polyvinyl acetals, polyvinyl ethers, polyvinyllactams, polyvinylamines and mixtures of the polymers mentioned.

Thermoplastic matrix materials which contain siloxane-containing block cocondensates inter alia and include a high proportion of fillers are known in principle. For instance, US20150197633A and US20150197632A describe polymer blends containing siloxane-containing block cocondensates inter alia, in combination with glass fibres. However, compositions of this kind cannot achieve the high values for modulus of elasticity. In the case of a multilayer composite material which is described in the present invention, the forces that act on the thermoplastic matrix at the surface are much higher and the formation of cracks, for example, is not comparable.

In a similar manner, filled materials comprising non-binding glass fibres and siloxane-containing block cocondensates are described in WO2013-170452 A1. Here too, there is a significant difference from multilayer composite materials, which exhibit a different structure and different physical characteristics compared to glass fibre-filled materials.

Multilayer composite materials having fibre layers embedded into a thermoplastic matrix have been described in the literature as well. For example, WO2015114427 describes multilayer composite materials additionally containing specific polyetherimide fibres. There is no description of siloxane-containing block cocondensates, or information concerning the bending characteristics.

The production of endless fibre-containing composite materials is described, for example, in EP 2886305A. The use of polycarbonate as matrix material is mentioned here as well. There is no description of block cocondensates.

Multilayer composite materials made from polycarbonate that exhibit particularly high flame retardancy are described in WO2015052114 A1. Siloxane-containing copolycarbonates are among the materials mentioned. There is no description of block cocondensates of the specific structure of the present application. In addition, this document does not describe any details relating to flexural stress and surface quality of the multilayer composite materials.

Endless fibre-containing composite materials are described in WO2012126910, but block cocondensates are not described.

The production of fibre composite material layers that are formed from unidirectional fibres and comprise thermoplastic matrix materials—called prepregs—is described in WO2011163365. Polycarbonates are among the materials with which the prepregs can be produced; siloxane-containing block cocondensates are not described.

Semifinished products in sheet form which consist of a thermoplastic matrix and are reinforced by a woven fabric, laid scrim or a unidirectional weave, and which can also contain polycarbonates among other materials, are described in US2011020572 A.

Polyetherimide-siloxane block cocondensates as matrix materials for fibre composite materials are described in US2014018491. However, these block cocondensates have an entirely different structure from the block cocondensates described here in accordance with the invention, and are much more costly.

The thermoplastic-based multilayer composite materials do have enormous strength, a high modulus of elasticity and mechanical puncture resistance, but in the event of deformations, for example bending, there can be tensile stresses and hence cracking in the thermoplastic matrix. This cracking is dependent on the deformation stress applied from the outside. Large forces give rise to microcracks that spread out proceeding from the surface into the multilayer composite material workpiece body. According to the stress and depending on the duration of the stress applied, these become larger and spread out further. Cracks of this kind impair the mechanical strength of the multilayer composite material and parts produced therefrom. In addition, they can lead to higher surface roughness, which is associated with a decrease in surface quality. These surface problems can also lead to problems in the painting process in surface finishing of the multilayer composite material. Paint solvent penetrating into corresponding surface defects can cause damage to the paint film in the course of later curing, for example as a result of blister formation. Surface defects and cracking of this kind in the thermoplastic matrix are therefore undesirable.

Furthermore, good adhesion of the respective fibres to the thermoplastic matrix is advantageous. If the adhesion is inadequate, when external stresses are applied, dynamic shocks or tensile effects can result in the collapse of the composite of thermoplastic matrix and fibre weave. This can then be manifested in increased cavity formation in the composite material.

The problem addressed is therefore that of providing a multilayer composite material having a lower tendency to cracking in the presence of deformation stresses. Moreover, the adhesion of the thermoplastic matrix to the fibre weave should be high.

It has been shown that, surprisingly, a multilayer composite material formed from multiple fibre composite material layers and comprising endless glass fibres or endless carbon fibres or glass fibres or carbon fibres, in each case as a weave or knit or else as a thermoplastic matrix, and specific siloxane-containing block cocondensates has a significantly lower tendency to form cracks compared to conventional multilayer composite materials.

The present invention therefore provides a fibre composite material comprising at least one layer of fibre material, where the fibre materials are selected from glass fibres and/or carbon fibres as endless fibres or as weaves and knits, embedded into a thermoplastic based on siloxane-containing block cocondensate (also referred to hereinafter as "SiCoPC" for short or as "polysiloxane block cocondensate" or "matrix material").

The present invention further provides a multilayer composite material comprising at least two, preferably at least three, mutually superposed layers of fibre composite material, wherein, in the case of three composite material layers, these are defined relative to one another as two external layers of fibre composite material and at least one internal layer of fibre composite material, where each of these at least two layers of fibre composite material comprises fibre material embedded in a thermoplastic based on siloxane-containing block cocondensate, where, in the case of endless fibres as fibre material, these are aligned unidirectionally in the respective layer.

In the case of endless fibres as fibre material, the inner layers of fibre composite material may have substantially the same orientation and their orientation may be rotated by 30° to 90° relative to the outer layers of fibre composite material, wherein the orientation of one layer of fibre composite material is determined by the orientation of the unidirectionally aligned fibres present therein.

In a preferred embodiment, the layers are arranged alternately. In this case, the outer layers are in a 0° orientation. It has been found to be particularly useful in practice when the inner layers of fibre composite material have the same orientation and their orientation is rotated by 90° relative to the outer layers of fibre composite material. It is alternatively conceivable to rotate the inner layers by 30°, 40°, 50°, 60°, 70° or 80° relative to the outer layers. In each case the orientation may deviate from the recited guide values by ±5°, preferably by ±3°, more preferably by ±1°. "Alternating" means that the inner layers are each arranged in an alternating manner by an angle of 90° or an angle of 30° to 90°. The outer layers are in a 0° orientation in each case. The angles may each be varied from 30° to 90° per layer.

In a further preferred embodiment, at least some of the layers have the same orientation and at least some other layers are rotated by 30° to 90°. In this case, the outer layers are in a 0° orientation.

In a further preferred embodiment, the inner layers have the same orientation and their orientation is rotated by 30° to 90° relative to the outer layers of fibre composite material, and the outer layers are present in a 0° orientation relative thereto.

These preferred embodiments are especially suitable for endless fibres.

In the case of weaves, the layers of fibre composite materials are stacked alternately in warp direction (0°) and weft direction (90°), or the above-specified angles.

In a particular embodiment, the multilayer composite material comprises six, preferably five, especially four, more preferably three, internal fibre composite material layers. However, the multilayer composite material according to the invention may also comprise two or more than six, for example seven, eight, nine, ten or more than ten inner fibre composite material layers.

There is in principle no limit to the number of fibre layers in a fibre composite material. It is therefore also possible for two or more fibre layers to be arranged one on top of another. Two fibre layers one on top of another may each be embedded individually into the matrix material, such that they are each surrounded by the matrix material on either side. In addition, two or more fibre layers may also lie directly one on top of another, such that their entirety is surrounded by the matrix material. In this case, these two or more fibre layers may also be regarded as one thick fibre layer. In one embodiment of the fibre composite material, the fibre layer takes the form of a unidirectional fibre layer, of a woven fabric or laid scrim layer, of a loop-drawn knit, loop-formed knit or braid, or of long fibres in the form of random fibre mats or nonwoven webs, or combinations thereof.

The inventive multilayer composite materials having polysiloxane block cocondensates as matrix material have high resistance to cracking under mechanical stress.

Materials of this kind can have a metallic appearance; metallic sound and metallic tactile properties, and metal-like mechanical properties. The multilayer composite materials of the invention also have the advantage that they can be produced inexpensively and that they are extremely lightweight because of the plastic used therein. In addition, the multilayer composite materials of the invention also feature good coatability and back-mouldability by injection moulding. What is also advantageous about the multilayer composite materials according to the invention is that the configuration, for example of a housing part, can be effected in a particularly simple and flexible manner owing to the thermoformability of the multilayer composite materials.

The fibres (fibre material) of the fibre material may have a wide variety of different kinds of chemical structure. The fibre materials preferably have a higher softening or melting point than the respective thermoplastic matrix material present. Examples of fibre materials include organic materials such as a wide variety of different kinds of silicatic and non-silicatic glasses, carbon, basalt, boron, silicon carbide, metals, metal alloys, metal oxides, metal nitrides, metal carbides and silicates, and also organic materials such as natural and synthetic polymers, for example polyacrylonitriles, polyesters, ultrahighly stretched polyolefin fibres, polyamides, polyimides, aramids, liquid-crystalline polymers, polyphenylene sulphides, polyether ketones, polyether ether ketones, polyetherimides, cotton and cellulose. Preference is given to high-melting materials, for example glasses, carbon, aramids, basalt, liquid-crystal polymers, polyphenylene sulphides, polyether ketones, polyether ether ketones and polyetherimides. Particularly preferred fibre materials are glass fibres or carbon fibres, in the form of endless fibres or else in the form of weaves and knits, particular preference being given to endless glass fibres or endless carbon fibres. The endless fibres in particular extend essentially over the entire length of the layer of fibre composite material.

Suitable fibre materials are endless glass fibres, endless carbon fibres, and weave-like fibres or knits. A layer of fibre material (also referred to as fibre layer) is understood to mean a flat layer formed by fibres arranged essentially in a plane. The fibres may be joined to one another by virtue of their position relative to one another, for example by virtue of a weave-like arrangement of the fibres. In addition, the fibre layer may also include a proportion of resin or another adhesive in order to bond the fibres to one another. The fibres may alternatively also be unbonded. This is understood to mean that the fibres can be separated from one another without expending any significant force. The fibre layer may also have a combination of bonded and unbonded fibres. At least one side of the fibre layer is embedded in SiCoPC as matrix material. This is understood to mean that the fibre layer is surrounded by the SiCoPC at least on one side, preferably on both sides. The outer edge of the fibre composite material or of the multilayer composite material is formed by the SiCoPC matrix.

In the context of the invention the term "endless fibre" should be understood as a delimitation from the short or long fibres that are likewise known to those skilled in the art. Endless fibres generally extend over the entire length of the layer of fibre composite material. The term "endless fibre" is derived from the fact that these fibres come wound on a roll and are unwound and impregnated with plastic during production of the individual layers of fibre composite material so that, save for occasional breakage or changeover of rolls, the length of said fibres typically substantially corresponds to the length of the produced layer of fibre composite material.

"Unidirectional" in the context of the invention means that the endless fibres are substantially unidirectionally aligned, i.e. point in the same direction lengthwise and thus have the same running direction. "Substantially unidirectional" here means that a deviation in the fibre running direction of up to 5% is possible. However, it is preferable when the deviation in the fibre running direction is markedly below 3%, more preferably markedly below 1%.

In one particular embodiment of the invention all fibre composite material layers of the multilayer composite material are joined face-to-face, wherein the fibre material is aligned unidirectionally within the respective layer and is embedded in the matrix material. It is optionally possible, in this embodiment, for further material layers to be present between the layers of the fibre composite material, for example finishing layers, for example paint layers, typically based on urethane-based and acrylate-based paint systems, in single-layer or multilayer form, which can be hardened thermally or by means of UV radiation (the surfaces, prior to finishing, can optionally be correspondingly pretreated, activated, for example by means of plasma or flame treatment, or cleaned).

In addition to the layers of fibre composite material the multilayer composite material according to the invention may also comprise one or more further layers. Examples that may be mentioned here are further layers of a plastic which may be identical to or different from the plastic matrix used in the layers of fibre composite material. These plastic layers may in particular also comprise fillers which are distinct from the fibre materials provided in accordance with the invention. The multilayer composite material according to the invention may additionally also comprise adhesive layers, woven layers, nonwoven layers or surface-enhancement layers, for example paint layers. These further layers may be present between inner and outer layers of fibre composite material, between a plurality of inner layers of fibre composite material and/or atop one or both of the outer layers of fibre composite material. However it is preferable when the outer layers of fibre composite material and the at least one inner layer of fibre composite material are joined to one another such that there are no further layers therebetween.

The multilayer composite material may also be composed exclusively of fibre composite material layers according to the invention which are unidirectionally aligned within the respective layer and embedded in a polycarbonate-based plastic, wherein one or more surface-enhancement layers, for example paint layers, may optionally be present atop one or both of the outer layers of fibre composite material.

The individual layers of fibre composite material may have a substantially identical or different construction and/or orientation.

A "substantially identical construction" of the fibre composite material layers is understood in the context of the invention to mean that at least one feature from the group comprising chemical composition, fibre volume content and layer thickness is identical.

"Chemical composition" is understood to mean the chemical composition of the polymer matrix of the fibre composite material and/or the chemical composition of the fibre material, such as endless fibres.

In a preferred embodiment of the invention the outer layers of fibre composite material have a substantially identical construction in terms of their composition, their fibre volume content and their layer thickness.

In a preferred embodiment of the invention the multilayer composite material has a total thickness of 0.5 to 2 mm, preferably 0.8 to 1.8 mm, in particular 0.9 to 1.2 mm, Practical tests have shown that the multilayer composite material according to the invention can achieve excellent mechanical properties even at these thin thicknesses.

It has been found to be particularly advantageous when the sum of all internal layers of fibre composite material has a total thickness of 200 µm to 1200 µm, preferably 400 µm to 1000 µm, more preferably 500 µm to 750 µm.

It is further advantageous in the context of the invention when the thickness of each of the two outer layers of fibre composite material is 100 to 250 µm, preferably 120 µm to 230 µm, more preferably 130 µm to 180 µm, respectively.

In a particular embodiment of the invention, a fibre composite material layer has a fibre volume content of ≥30% by volume and ≤60% by volume, preferably ≥35% by volume and ≤55% by volume, more preferably of ≥37% by volume and ≤52% by volume. If the fibre volume content is less than 30% by volume then the mechanical properties of the resulting fibre composite material under a point load are often suboptimal, i.e. the fibre composite material cannot adequately withstand a point load and in some cases is even pierced. A fibre volume content of over 60% by volume likewise results in a deterioration of the mechanical properties of the fibre composite material. Without wishing to be bound to any scientific theories the reason for this seems to be that the fibres can no longer be adequately wetted during impregnation at such high fibre volume contents, leading to an increase in air inclusions and to increased occurrence of surface defects in the fibre composite material.

In one embodiment of the multilayer composite material, the volume content of the fibre material in the total volume of the multilayer composite material is in the range from 30% to 60% by volume, preferably in the range of 40% to 55% by volume.

In one embodiment of the invention the outer layers of fibre composite material have a fibre volume content of not more than 50% by volume, preferably not more than 45% by volume, in particular not more than 42% by volume.

In one particular embodiment of the invention the outer layers of fibre composite material have a fibre volume content of at least 30% by volume, preferably at least 35% by volume, in particular at least 37% by volume.

These upper and lower limits for the fibre volume content are associated with particularly advantageous mechanical properties as described further up.

In a further particular embodiment of the invention, the outer layers of fibre composite material have a lower volume content of fibres based on the total volume of the layer of fibre composite material than the at least one inner layer of fibre composite material.

The inner layers of fibre composite material can have a fibre volume content of 40% to 60% by volume, preferably 45% to 55% by volume, more preferably 48% to 52% by volume, based on the total volume of the layer of fibre composite material.

"% by volume" is understood here to mean the proportion by volume (% v/v), based on the total volume of the layer of fibre composite material.

The at least three layers of fibre composite material in the multilayer composite material according to the invention preferably have essentially no voids, in particular essentially no air inclusions.

"Essentially no voids" in one embodiment means that the void content of the at least three layers of fibre composite material in the multilayer composite material according to the invention is below 2% by volume, in particular below 1% by volume, more preferably below 0.5% by volume.

The void content of a fibre composite material layer or of the multilayer composite material can be determined in different ways which are regarded as generally accepted. For example the void content of a test specimen can be determined by the resin ashing test, in which a test specimen is exposed for example to a temperature of 600° C. for 3 hours in an oven in order to incinerate the resin which encloses the fibres in the test specimen. The mass of the thus exposed fibres may then be determined in order to arrive after a further computational step at the void content of the test specimen. Such a resin ashing test can be performed as per ASTM D 2584-08 to determine the individual weights of the fibres and of the polymer matrix. The void content of the test specimen can be determined therefrom in a further step by utilizing the following equation 1:

$$Vf=100*(\rho t-\rho c)/\rho t \qquad \text{(equation 1)}$$

where
Vf is the void content of the sample in [%];
ρc is the density of the test specimen, determined by liquid or gas pycnometry for example;
ρt is the theoretical density of the test specimen determined as per the following equation 2:

$$\rho t=1/[Wf/\rho f+Wm/\rho m] \qquad \text{(equation 2)}$$

ρm is the density of the polymer matrix (for example for an appropriate crystallinity);
ρf is the density of the fibres used;
Wf is the proportion by weight of the fibres used and
Wm is the weight fraction of the polymer matrix.

Alternatively, the void content may be determined by chemical dissolution of the polymer matrix out of the test specimen as per ASTM D 3171-09. The resin aching test and the chemical dissolution method are more suitable for glass fibres which are generally inert to melting or chemical treatment. Further methods for more sensitive fibres are indirect computation of the void content by the densities of the polymer, of the fibres and of the test specimen as per ASTM D 2734-09 (method A), wherein the densities can be determined as per ASTM D792-08 (method A). Furthermore, it is also possible to employ image processing programs, grid templates or defect counting to evaluate the void content of an image recording determined by conventional microscopy.

A further way to determine void content is the thickness difference method which comprises determination of the layer thickness difference between a theoretical component thickness and the actual component thickness for known basis weights and densities of polymer and fibre. Computation of the theoretical component thicknesses assumes no voids are present in the construction and complete wetting of the fibres with polymer. Relating the thickness difference to the actual component thickness affords the percentage void content. These thicknesses may be measured with a micrometer for example. For this method, error-minimized results can preferably be determined by determining the void content on components composed of a plurality of individual layers, preferably more than 4 layers, more preferably more than 6 layers and very particularly preferably more than 8 layers.

While all the above-described processes result in comparable results when co-testing an appropriate standard, the void contents as described here were determined by the thickness difference method as reported in the examples.

It is very particularly preferable when the three layers of fibre composite material of the multilayer composite material according to the invention have no voids, in particular no air inclusions.

Siloxane-based block cocondensates in the context of the present invention are polysiloxane-polycarbonate block cocondensates. Polysiloxane-polycarbonate block cocondensates of this kind have good properties with regard to low-temperature impact resistance or low-temperature notched impact resistance, chemical resistance and flame retardancy.

The siloxane-containing block cocondensates relate to block cocondensates containing the following structural units:

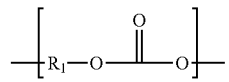

(1)

where R1 is a divalent substituted or unsubstituted aromatic radical, a divalent linear or cyclic aliphatic radical
or the structural unit (1) is a mixture of units, where R1 is a divalent substituted or unsubstituted aromatic radical or R1 is a divalent linear or cyclic aliphatic radical. The proportion of aromatic R1 radicals is 60%-100% by weight and the proportion of aliphatic radicals is 0%-40% by weight, based on the sum total of diphenols of the formula (3) used in % by weight,
and structural unit (2)

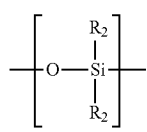

(2)

where R2 is independently a linear or branched aliphatic radical, preferably C1-C12 alkyl, more preferably C1 to C4 alkyl, especially methyl, or a substituted or unsubstituted aromatic radical, preferably phenyl.

Very particularly preferred structural units (2) are dimethylsiloxane units, diphenylsiloxane units, methyl/phenylsiloxane units or mixtures of dimethylsiloxane and diphenylsiloxane units.

In the structural unit (1), R1 is preferably derived from dihydroxyaryl compounds corresponding to the formula (3):

H—Z—OH (3)

in which

Z is an aromatic radical which has 6 to 30 carbon atoms and may comprise one or more aromatic rings, may be substituted and may comprise aliphatic radicals or alkylaryls or heteroatoms as bridging elements.

Preferably, Z in formula (3) is a radical of the formula (3a)

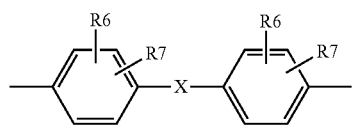

(3a)

in which

R6 and R7 are independently H, C1-C18-alkyl, C1-C18-alkoxy, halogen such as Cl or Br or in each case optionally substituted aryl or aralkyl, preferably independently H or C1-C12-alkyl, more preferably H or C1-C8-alkyl and most preferably independently H or methyl, and X is —CO—, —O—, —S—, C1- to C6-alkylene, C2- to C5-alkylidene, C6 to C10-cycloalkylidene or C6- to C12-arylene which may optionally be fused to further aromatic rings containing heteroatoms.

Preferably, X is C1 to C5-alkylene, C2 to C5-alkylidene, C6 to C9-cyclohexylidene —O—, —SO—, —CO—, —S—, —SO2—, more preferably isopropylidene, 3,3,5-trimethylcyclohexylidene or oxygen, especially isopropylidene.

Examples of diphenols of formula (3) that are suitable for the production of the SiCoPCs according to the invention include hydroquinone, resorcinol, bis(hydroxyphenyl)alkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, [alpha],[alpha]'-bis(hydroxyphenyl)diisopropylbenzenes and also the alkylated, ring-alkylated and ring-halogenated compounds thereof.

Further-preferred diphenols of the formula (3) are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, bis[2-(3,5-dimethyl-4-hydroxyphenyl)-2-propyl]benzene, 1,1-bis(4-hydroxyphenyl)cyclohexane and 1,1-bis(4-hydroxyphenyl)-3,3,5-trimethylcyclohexane.

Particularly preferred diphenols of the formula (3) are 2,2-bis(4-hydroxyphenyl)propane (BPA), hydroquinone, 1,1-bis(4-hydroxyphenyl)-3,3,5-trimethylcyclohexane and 2,2-bis(3-methyl-4-hydroxyphenyl)propane.

These and further suitable diphenols are commercially available and are described, for example, in "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker New York 2000, p. 72 ff."

In one embodiment, the siloxane block may have the following structure (4)

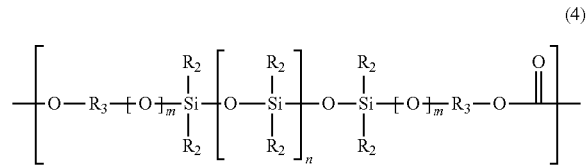

(4)

where R2 has the definition given above, n is 1 to 150, preferably 1 to 100, even more preferably 3 to 50 and especially 5 to 30, and m is 0 or 1, preferably 0.

R3 independently comprises the following structures:

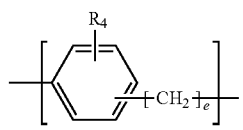

(5)

where R4 is independently hydrogen, halogen and/or in each case a C1 to C10, preferably C1 to C4, linear or branched, unsubstituted or mono- to tetrasubstituted alkyl radical or alkoxy radical, the alkyl and alkoxy radicals preferably being unsubstituted, and R4 especially preferably being hydrogen, e is a natural number from 2 to 12, preferably 2 to 6.

In a further embodiment, R3 is derived from hydroquinone, a substituted hydroquinone radical or a structural element of the formula (6)

(6)

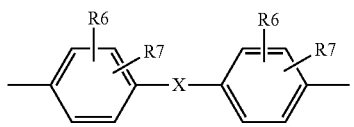

where R6, R7 and X have the definitions given in formula (3a).

For example and with preference, the siloxane block may comprise the following structures, or is derived from the following structures:

(7)

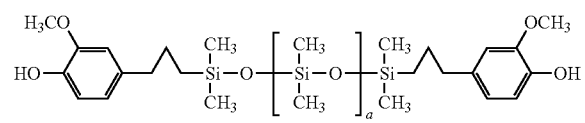

(8)

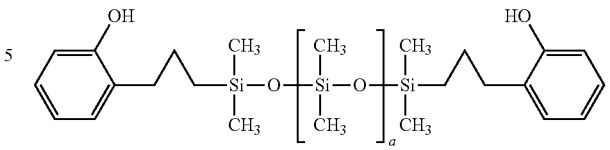

where a is an average number of repeat units from 1 to 150, preferably 1 to 100, more preferably 3 to 50 and especially 5 to 30.

In a further embodiment, the abovementioned siloxane blocks can be joined singly or multiply via terephthalic acid or isophthalic acid to form the following structural elements shown by way of example:

(9)

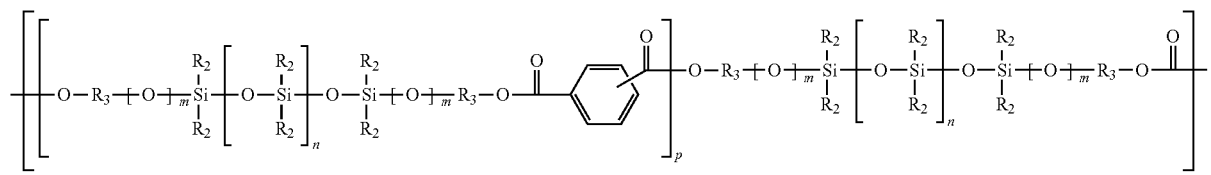

where p is 1 to 5,
R2, R3, n and m have the definition given above for the structural element (4).

Corresponding siloxane blocks for reaction with polycarbonate or for reaction with diphenols of the formula (3) or (3a) with phosgene or diaryl carbonates each have terminal phenolic OH groups. These are (9a)

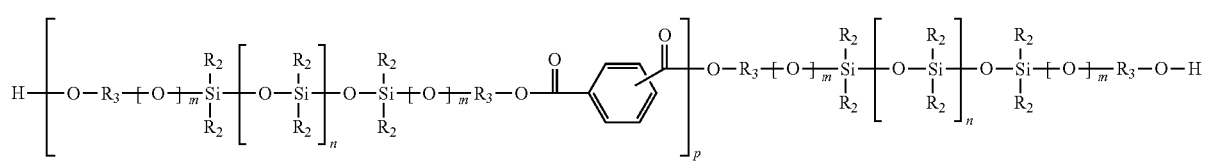

where R2, R3, n, m and p have the definitions given above for the structural element (9).

In a further embodiment, preferred siloxane blocks are hydroxyaryl-terminated polysiloxanes and correspond to the formula (10)

(10)

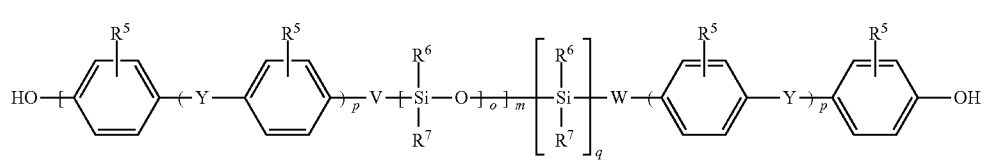

In the general formula (10), $R^5$ is preferably hydrogen or methyl, more preferably hydrogen.

$R^6$ and $R^7$ (corresponding to R2) are preferably methyl.

Y is preferably a single bond, —CO—, —O—, $C_1$- to $C_5$-alkylene, $C_2$ to $C_5$-alkylidene or a $C_5$ to $C_6$-cycloalkylidene radical which may be mono- or polysubstituted by $C_1$ to $C_4$-alkyl, more preferably a single bond, —O—, isopropylidene or a $C_5$ to $C_6$-cycloalkylidene radical which may be mono- or polysubstituted by $C_1$ to $C_4$-alkyl, and especially isopropylidene.

V is a single bond, oxygen, C1-C6 alkylene, C2- to C5-alkylidene or C1-C6 alkoxy, preferably a single bond, C3 alkylene or C3 alkoxy.

W is a single bond; S, C1 to C6 alkylene, C2- to C5-alkylidene or C1 to C6 alkoxy, preferably a single bond, C3 alkylene or C3 alkoxy.

p and q are each independently 0 or 1.

o is an average number of repeat units from 10 to 400, preferably 10 to 100, more preferably 20 to 60.

m is an average number of repeat units from 1 to 6, preferably 2 to 5.

The product of oxm is preferably a number from 12 to 400, more preferably 15 to 200.

Especially preferred are siloxanes of the formulae (11) and (12)

Details of the production of polycarbonates have been set out in many patent specifications during the last approximately 40 years. Reference may be made here merely by way of example to Schnell, "Chemistry and Physics of Polycarbonates", Polymer Reviews, Volume 9, interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Preferred modes of preparation for the polycarbonates are the known interfacial process and the known melt transesterification process (cf. for example WO 2004/063249 A1, WO 2001/05866 A1, WO 2000/105867, U.S. Pat. Nos. 5,340,905, 5,097,002, 5,717,057).

The content of siloxane blocks in the SiCoPC is greater than 0%, preferably 0.5% to 40% by weight, preferably 1% to 20% by weight, especially preferably 2% to 15% by weight and most preferably 2% to 10% by weight, based in each case on the siloxane blocks and polycarbonate blocks

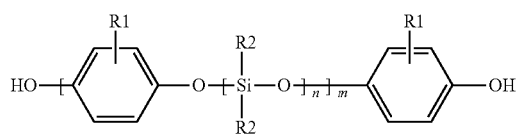

(11)

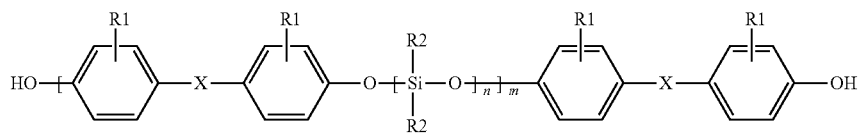

(12)

where R1 is H, Cl, Br or C1-C4-alkyl, preferably H or methyl and especially preferably hydrogen, R2 is aryl or C1-C4-alkyl, preferably methyl, X is a single bond, —SO2-, —CO—, —O—, —S—, C1- to C6-alkylene, C2- to C5-alkylidene, or C6- to C12-arylene which may optionally be fused to aromatic rings containing further heteroatoms.

Preferably, X is a single bond, isopropylidene, 3,3,5-trimethylcyclohexylidene or oxygen, and most preferably isopropylidene, n is an average number from 1 to 300, preferably 2 to 200, especially preferably from 10 to 150, preferably from 20 to 100, and m is an average number from 1 to 10, preferably from 1 to 6 and especially preferably from 1.5 to 5.

The molecular weight of the siloxane blocks is 3000 to 20 000 g/mol, preferably 4000-15 000 g/mol, determined by means of gel permeation chromatography (GPC) and polycarbonate from bisphenol A as diphenol as standard.

The preparation of the siloxane blocks is known in principle and they can be prepared by processes as described, for example, in US20130267665.

The preparation of polycarbonates is likewise known. The polycarbonates are produced in a known manner from diphenols, carbonic acid derivatives, and optionally chain terminators and branching agents.

used. Correspondingly, the proportion of poly/carbonate blocks in the block cocondensate is 60% to less than 100% (preferably 99.5%) by weight, preferably 99% to 80% by weight, especially preferably 98% to 85% by weight and most preferably 98% to 90% by weight.

The abovementioned siloxane blocks are preferably reacted with polycarbonates having molecular weights of 15 000 to 27 000, especially preferably of 17 000 to 27 000 and especially preferably of 18 000 to 26 500 g/mol (measured by means of GPC with BPA polycarbonate as standard).

The diphenols for preparation of the polycarbonates are the abovementioned structural units (3).

The individual components (siloxane block and polycarbonate block) are reacted here by the reactive extrusion process, or alternatively the siloxane blocks with diphenols of the formula (3), are reacted with phosgene or diaryl carbonates by the known interfacial process. There are manifold descriptions of this process for polycarbonate synthesis in the literature; reference is made by way of example to H. Schnell, Chemistry and Physics of Polycarbonates, Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Dres. U. Grigo, K. Kircher and P. R. Müller "Polycarbonate" in Becker/Braun, Kunststoff- Handbuch, volume 3/1, Polycarbonate, Polyacetale, Polyester, Celluloseester, Carl Hanser Verlag Munich, Vienna, 1992, p. 118-145, and to EP-A 0 517 044. The conversion of polyorganosiloxanes in the interfacial process is described, for example, in U.S. Pat. No. 3,821,325.

The SiCoPCs can be prepared in a reactive extrusion process as described, for example, in WO 2015/052110.

The aggregates to be used may be a single-shaft reactor, a twin-shaft reactor, a planetary roll extruder or a ring extruder. In addition, the aggregate may be a polymer kneader of high volume.

Preference is given to conducting the process in a reactor combination consisting of a preliminary reactor and a high-viscosity reactor at temperatures of 280° C. to 400° C., preferably of 300° C. to 390° C., further preferably of 320° C. to 380° C. (present in the high-viscosity reactor) and most preferably of 330° C. to 370° C., and pressures of 0.001 mbar to 50 mbar, preferably 0.005 mbar to 40 mbar, especially preferably 0.02 to 30 mbar and most preferably 0.03 to 5 mbar (present in the high-viscosity reactor), preferably in the presence of a catalyst, which is characterized in that polycarbonates having molecular weights of 15 000 to 27 000, especially preferably of 17 000 to 27 000 and especially preferably of 18 000 to 26 500 g/mol (measured by means of GPC with BPA polycarbonate as standard) are used.

If the reactive extrusion process is used for preparation of the block cocondensates, in a preferred embodiment, polycarbonates containing particular rearrangement structures are used. The polycarbonates for use in this embodiment contain at least one and preferably more than one of the following structures (13) to (16):

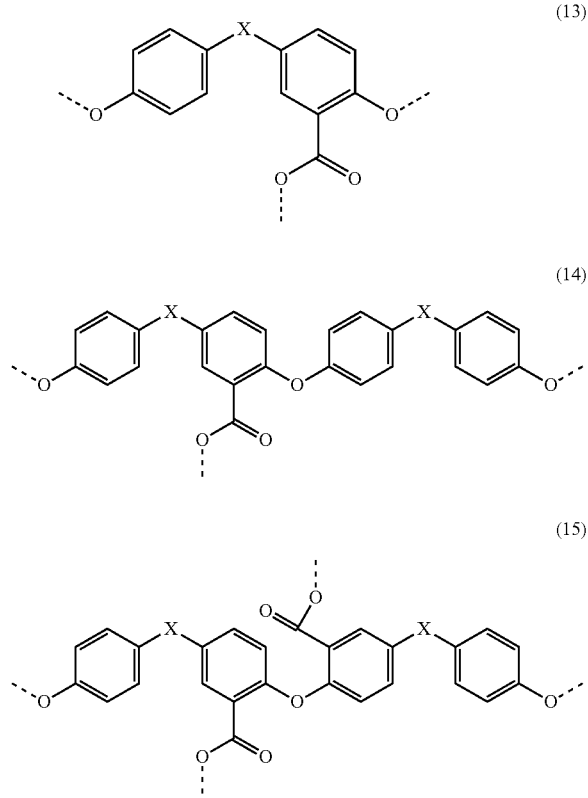

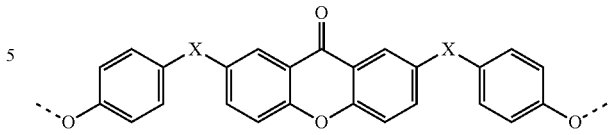

in which the phenyl rings are independently mono- or disubstituted by C1-C8 alkyl, halogen, preferably C1 to C4 alkyl, more preferably methyl and most preferably H, and X is a single bond, C1 to C6 alkylene, C2 to C5 alkylidene or C5 to C6 cycloalkylidene, preferably a single bond and C1 to C4 alkylene and especially preferably isopropylidene, where the amount of structural units (13) to (16) in total (determined after hydrolysis) is generally in the range from 50 to 1000 ppm, preferably in the range from 80 to 850 ppm.

Preference is further given to polycarbonates that bear phenol as end groups (phenyl-terminated polycarbonate).

In order to determine the amount of the rearrangement structures, the particular polycarbonate is subjected to a total hydrolysis and hence the corresponding degradation products of the formulae (13a) to (16a) are formed, the amount of which is determined by HPLC (this can be accomplished, for example, as follows: The polycarbonate sample is hydrolysed under reflux by means of sodium methoxide. The corresponding solution is acidified and concentrated to dryness. The drying residue is dissolved in acetonitrile and the phenolic compounds of the formula (1a) to (4a) are determined by means of HPLC with UV detection):

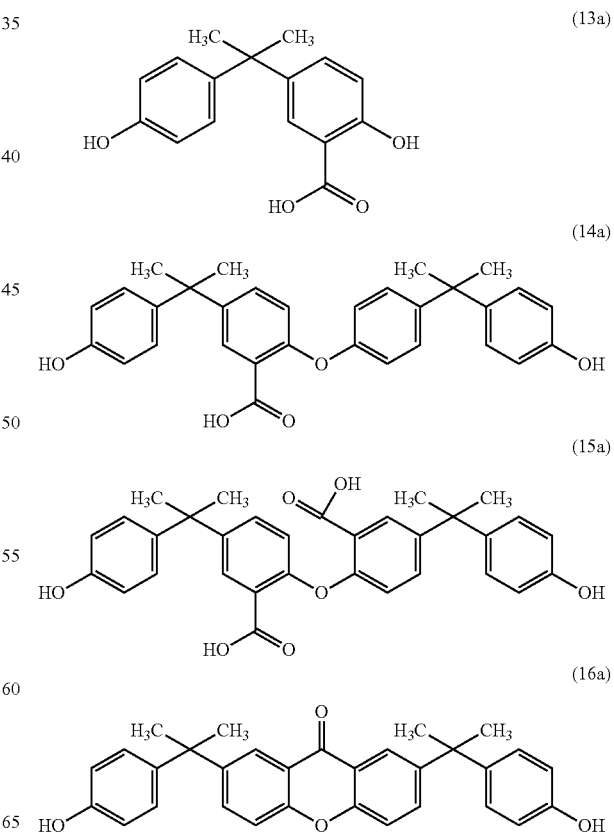

Preferably, the amount of the compound of the formula (13a) released is 20 to 800 ppm, more preferably 25 to 700 ppm and especially preferably 30 to 500 ppm.

Preferably, the amount of the compound of the formula (14a) released is 0 (i.e. below the detection limit of 10 ppm) to 100 ppm, more preferably 0 to 80 ppm and especially preferably 0 to 50 ppm.

Preferably, the amount of the compound of the formula (15a) released is 0 (i.e. below the detection limit of 10 ppm) to 800 ppm, further preferably 10 to 700 ppm and more preferably 20 to 600 ppm, and most preferably 30 to 350 ppm.

Preferably, the amount of the compound of the formula (16a) released is 0 (i.e. below the detection limit of 10 ppm) to 300 ppm, preferably 5 to 250 ppm and especially preferably 10 to 200 ppm.

The SiCoPCs preferably have sodium contents of less than 200 ppb and especially preferably less than 150 ppb.

It is possible to add additives to the polysiloxane-polycarbonate block cocondensates obtainable by the process according to the invention in amounts of 0.0% by weight to 5.0% by weight, preferably 0.01% by weight to 1.00% by weight. The additives are commercial polymer additives, for example the following additives that are described in EP-A 0 839 623, WO-A 96/15102, EP-A 0 500 496 or "Plastics Additives Handbook", Hans Zweifel, 5th Edition 2000, Hanser Verlag, Munich: flame retardants, UV stabilizers, gamma stabilizers, antistats, optical brighteners, flow improvers, thermal stabilizers, inorganic pigments, demoulding agents or processing aids.

These additives can be added to the polymer melt singly or in any desired mixtures or a plurality of different mixtures, namely in that additives can be fed in directly in the isolation of the polymer (for example such a side unit such as a secondary extruder) as a pure substance or as a masterbatch in polycarbonate, or else after melting of pelletized material in a so-called compounding step. The additives or the mixtures thereof can be added to the polymer melt as a solid, i.e. as a powder, or as a melt. Another mode of metered addition is the use of masterbatches or mixtures of masterbatches of the additives or additive mixtures.

In a preferred embodiment, the polymer composition comprises thermal stabilizers or processing stabilizers as also described in WO 2015/052110. Phosphites and phosphonites are preferentially suitable, as are phosphines. Examples are triphenylphosphine (TPP), trialkylphenylphosphine, bisdiphenylphosphinoethane or a trinaphthylphosphine, triphenyl phosphite, diphenyl alkyl phosphite, phenyl dialkyl phosphite, tris(nonylphenyl) phosphite, trilauryl phosphite. Especially preferred are triphenyiphosphine (TPP), Irgafos® 168 (tris(2,4-di-tert-butylphenyl) phosphite) and tris(nonylphenyl) phosphite or mixtures thereof.

In addition, it is possible to use phenolic antioxidants such as alkylated monophenols, alkylated thioalkylphenols, hydroquinones and alkylated hydroquinones. Particular preference is given to using Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl)phenol).

Suitable UV absorbers are described, for example, in EP 1 308 084 A1, in DE 102007011069 A1 and in DE 10311063 A1.

Particularly suitable ultraviolet absorbers are hydroxybenzotriazoles such as 2-(3',5'-bis(1,1-dimethylbenzyl)-2'-hydroxyphenyl)benzotriazole (Tinuvin® 234, Ciba Spezialitätenchemie, Basle), 2-(2'-hydroxy-5'-(tert-octyl)phenyl) benzotriazole (Tinuvin® 329, Ciba Spezialitätenchemie, Basle), 2-(2'-hydroxy-3'-(2-butyl)-5'-(tert-butyl)phenyl)benzotriazole (Tinuvin® 350, Ciba Spezialitätenchemie, Basle), bis(3-(2H-benztriazolyl)-2-hydroxy-5-tert-octyl)methane, (Tinuvin® 360, Ciba Spezialitätenchemie, Basle), (2-(4,6-diphenyl-1,3,5-triazin-2-yl)-5-(hexyloxy)phenol (Tinuvin® 1577, Ciba Spezialitätenchemie, Basle), and the benzophenones 2,4-dihydroxybenzophenone (Chitnasorb® 22, Ciba Spezialitätenchemie, Basle) and 2-hydroxy-4-(octyloxy) benzophenone (Chimassorb® 81, Ciba, Basle), 2-propenoic acid, 2-cyano-3,3-diphenyl-, 2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basle) or tetraethyl 2,2'-(1,4-phenylenedimethylidene) bismalonate (Hostavin® B-Cap, Clariant AG).

It is also possible to use mixtures of these ultraviolet absorbers.

The polymer compositions according to the invention may optionally comprise demoulding agents. Particularly suitable demoulding agents are pentaerythritol tetrastearate (PETS) or glycerol monostearate (GMS) or mixtures thereof.

In addition, it is also possible to add other polymers to the block cocondensates according to the invention, for example polyester carbonate, polystyrene, styrene copolymers, aromatic polyesters such as polyethylene terephthalate (PET), PET-cyclohexanedimethanol copolymer (PETG), polyethylene naplithalate (PEN), polybutylene terephthalate (PBT), cyclic polyolefin, poly- or copolyacrylates and poly- or copolymethacrylate, for example poly- or copolymethylmethacrylate (such as PMMA), and also copolymers with styrene, for example transparent polystyrene-acrylonitrile (PSAN), thermoplastic polyurethanes, polymers based on cyclic olefins (e.g. TOPAS®, a commercial product from Ticona).

The invention further provides a process for producing the fibre composite material according to the invention or the multilayer composite material, and a process for producing a component obtainable from a multilayer composite material, and also for the use of the multilayer composite material for production of a housing, for example for an electronic device or as a component in automotive applications, and the component or housing obtainable therefrom.

Production of the fibre composite materials and the multilayer composite materials: The fibre composite material layers of the multilayer composite material according to the invention may be produced by the customary processes for producing fibre composite materials known to one skilled in the art.

For the production of the fibre composite materials or multilayer composite materials according to the invention, it is possible to use various production methods. It is possible here firstly to make a fundamental distinction as to whether the fibre composite material or composite sheet consists, for example, of unidirectional fibre layers, weave layers, random fibre layers or combinations thereof, wherein unidirectional fibres can be introduced into the composite sheet either in the form of a semifinished product (e.g. laid scrim) or directly as a pure fibre strand. In the case of the latter approach, the fibre strands are generally first impregnated at least in one layer with the thermoplastic resin (the fibre composite material), in order then to be pressed to form a multilayer system (laminate), the multilayer composite material, there being various methods here for the impregnation. If the composite sheet is produced from semifinished fibre products (weaves, scrims, random fibres etc.), the prior art likewise indicates various means by which fibres and matrix can be combined. Standard methods are, for example, the process with the aid of powder prepregs or what is called the film stacking process. The film stacking process can preferably be used for the production of the above-described fibre composite materials. This involves alternate layering of films and weave layers, where the basis weight of the weave and thickness of the films, for example, can be matched to one another so as to obtain a desired fibre volume content.

In a preferred embodiment of the invention the fibre composite material layers of the multilayer composite material are producible by applying a molten polycarbonate-based plastic to an endless fibre web preheated to above the glass transition temperature of the plastic under pressure-shear vibration. Such a production process is described in DE 10 2011 005 462 B3.

An "endless fibre web" is understood in accordance, with the invention to mean, a plurality of rovings that have been brought together, wherein the rovings are untwisted bundles of many endless fibres.

The preferred process for producing a fibre composite material layer of the multilayer composite material especially comprises the following steps:
  providing an endless fibre web and conveying the endless fibre web along a processing line,
  preheating the endless fibre web to a processing temperature higher than the glass transition temperature of the polycarbonate-based plastic,
  applying the molten polycarbonate-based plastic over an entire width of the endless fibre web onto one surface of the endless fibre web,
  applying a pressure on to the endless fibre web perpendicular to the plane of the web after the application of the polycarbonate-based plastic, wherein the application of pressure is effected with at least one pressing ram with simultaneous application of shear vibration to the pressing ram with a vibratory motion component in the web plane and transverse to a web running direction,
  holding the endless fibre web within a processing temperature range above the glass transition temperature of the polycarbonate-based plastic at least until the application of pressure-shear vibration has been terminated.

Melt application with the following application of pressure-shear vibration for as long as the raw fibre web is at a temperature above the glass transition temperature of the polycarbonate-based plastic results in an efficacious incorporation of the plastic melt into the entire fibre volume structure of the raw fibre web. It is preferable not to exceed an endless fibre web temperature of 380° C. The temperature of the endless fibre web is typically between 180° C. and 260° C., preferably between 200° C. and 240° C., more preferably between 210° C. and 230° C., in particular 220° C. Where reference is made to heating to above the glass transition temperature of the plastic or holding at above the glass transition temperature of the plastic, this means heating to a temperature at which the plastic is in a fully molten state. The glass transition temperature of the plastic may be determined as per DIN EN ISO 17025. A difference between the fibre temperature and the melt temperature on contacting of the plastic melt with the endless fibre web is in the range from 60° C. to 120° C., preferably from 70° C. to 110° C., more preferably from 80° C. to 100° C. The application of pressure-shear vibration causes efficient expulsion of gas volumes still present within the raw fibre web. The process may be performed in continuous fashion. The holding of the endless fibre web at a temperature above the glass transition temperature of the plastic ensures that the polycarbonate-based plastic does not undergo undesired solidification before complete penetration and apportioning within and atop the endless fibre web. This maintaining of a temperature above the glass transition temperature of the plastic may be continued after termination of the application of pressure-shear vibration during a resting interval, Once the indicated process steps have been performed the produced, impregnated endless fibre web may be cooled in a defined manner. The endless fibre web may comprise a multiplicity of endless fibres. The application of pressure-shear vibration makes it possible to achieve good plastic penetration of the fibre web, i.e. good impregnation, with little, if any, damage to the fibres.

It is particularly preferable when the process for producing a fibre composite material layer of the multilayer composite material is run such that the application of the polycarbonate-based plastic to the endless fibre web is effected while the endless fibre web is conveyed under ambient atmospheric pressure. Such an application of the plastic avoids complex and inconvenient external sealing of a pressurized application chamber.

It is further preferable to run the process for producing a fibre composite material layer of the multilayer composite material such that the application of pressure-shear vibration to a section of the endless fibre web after plastic application is effected consecutively and repeatedly along the processing line. It is also possible to run the process such that the application of pressure-shear vibration to a section of the endless fibre web after plastic application is effected from both sides of the web plane. Repeated application of pressure-shear vibration increases the efficiency of the production process. Transverse motion components of the various devices for application of pressure-shear vibration may be controlled in synchronized opposing fashion, i.e. in a push-pull manner. A rest interval where the raw fibre web does not have a pressure and/or shear vibration applied to it for a predefined time interval may in each case be provided in a targeted fashion between the consecutive applications of pressure-shear vibration. An application of pressure-shear vibration from both sides may be effected by way of pressure application devices arranged consecutively in the processing line. Alternatively, a simultaneous application of pressure-shear vibration from both sides is possible. The application of pressure-shear vibration from both sides can also be effected with the transverse motion components occurring in synchronized opposing fashion, i.e. in a controlled push-pull manner.

The frequencies of the application of pressure-shear vibration may be in the range between 1 Hz and 40 kHz. Amplitudes of the application of shear vibration may be in the range between 0.1 mm and 5 mm. A pressure of the application of pressure-shear vibration may be in the range between 0.01 MPa and 2 MPa.

"Joining the layered layers of fibre composite material" is understood in accordance with the invention to mean any process which results in a physical joining of the layered layers of fibre composite material. It is preferable when the joining of the layered layers of fibre composite material to afford the multilayer composite material is effected by means of pressure and/or temperature, for example by lamination. The pressure employed for joining the layered layers of fibre composite material to afford the multilayer composite material may be in the range from 5 to 15 bar, preferably 7 to 13 bar, more preferably 8 to 12 bar. The temperature for joining the fibre composite material layers may be 80° C. to 300° C. If a joining process with heating and cooling zones is employed the temperature for joining the fibre composite material layers in the heating zones may be from 220° C. to 300° C., preferably from 230° C. to 290° C., more preferably from 240° C. to 280° C. The temperature in the cooling zones may be from 80° C. to 140° C., preferably from 90° C. to 130° C., more preferably from 100° C. to 120° C.

However, in addition to lamination, adhesive bonding or welding to join the layered layers of fibre composite material are also possible.

In a preferred embodiment the joining of the layered layers of fibre composite material results in face-to-face layers of fibre composite material. "Face-to-face" in this context means that at least 50%, preferably at least 75%, 90%, 95%, 99% or 100% ("uniform" joining) of the surfaces of two adjacent layers of the fibre composite material that are facing one another are directly interjoined. The degree of joining may be determined in sections by microscopy or else determined by the absence of voids, for example air inclusions, in the fibre composite material.

Multilayer composite materials can additionally also be produced by means of a static press. This involves alternate layering of films of SiCoPC and the weave layers, where the outer layers are each concluded by a film layer.

A further advantage of the multilayer composite material according to the invention is that it may be formed into any desired shape. Forming may be achieved by any forming processes known to one skilled in the art. Such forming processes may be effected under the action of pressure and/or heat.

In one embodiment of the process according to the invention the forming is effected under the action of heat, in particular by thermoforming.

In order to obtain better compatibility of the fibre layers and especially of the endless fibres with the thermoplastic matrix materials, the fibre layers, especially the endless fibres or weaves/knits, can be surface pretreated with a silane compound. Preferred silane compounds are aminopropyltrimethoxysilane, aminobutyltrimethoxysilane, aminopropyltriethoxysilane, aminobutyltriethoxysilane.

Generally, the fibres can be chemically and/or physically modified by means of sizes in such a way as to establish, for example, the desired degree of binding between fibres and the matrix material in the subsequent production of fibre composite materials from the fibre layers and the matrix material. For this purpose, it is possible to use any sizes known to those skilled in the art, specifically not only the abovementioned silane compounds but also preferably the epoxy resins and derivatives thereof, epoxy esters, epoxy ethers, epoxy urethanes, polyurethane esters, polyurethane ethers, isocyanates, polyamides, polyamides, and any desired mixtures of two or more of the aforementioned compounds. The specific selection of the size material depends on the material for the fibres and the desired strength of binding. The size can be used here, for example, in the form of an aqueous or nonaqueous solution or emulsion, and the size can be attached to the fibres according to the invention by known methods for the sizing of short fibres, for example in a dipping process.

An essential aspect is the fact that the structure-stiffening fibre material and the thermoplastic material enter into a cohesive bond with one another. The cohesive bond is established via the process parameters, especially melt temperature and mould temperature and pressure, and also depends on the abovementioned size.

The invention further provides a housing part which is suitable for use as, or employment in, a housing of an electronic device, wherein the housing part comprises a multilayer composite material according to the invention or is obtainable by the process for producing a housing part according to the invention and wherein the housing of an electronic device is preferably the monitor backside or the underside of a laptop.

Housing parts obtainable from the composite materials according to the invention are used especially in the IT sector as housing parts, for example, for computers, monitors, tablets or telephones. For example a housing part may be the back of a mobile phone, the underside of a laptop, the monitor backside of a laptop, the back of a tablet etc. or else may merely be a constituent of a back of a mobile phone, an underside of a laptop, a monitor backside of a laptop, a back of a tablet etc.

The invention further provides components or structural and trim elements for motor vehicle interiors (walls, cover trim, doors, windows, etc.), parcel shelves, driver's console, tables, sound insulation and other insulation materials, vertical surfaces of the outer vehicle skin, outer faces of the underbody, light covers, light diffusers, etc., where the part or structure and trim element comprises a multilayer composite material according to the invention. Fibre composite materials of the present invention can also be used for production of thin-wall mouldings (for example data systems housing parts, TV housings, notebooks), where particularly high demands are made on notched impact resistance, weld line strength, flame retardancy and surface quality of the materials used, and also for production of housing parts, for example for domestic appliances, office equipment such as monitors or printers, or cover panels for the construction sector and parts for the motor vehicle sector or parts for the electrical sector, which likewise form part of the subject-matter of the present invention.

Figure 2:
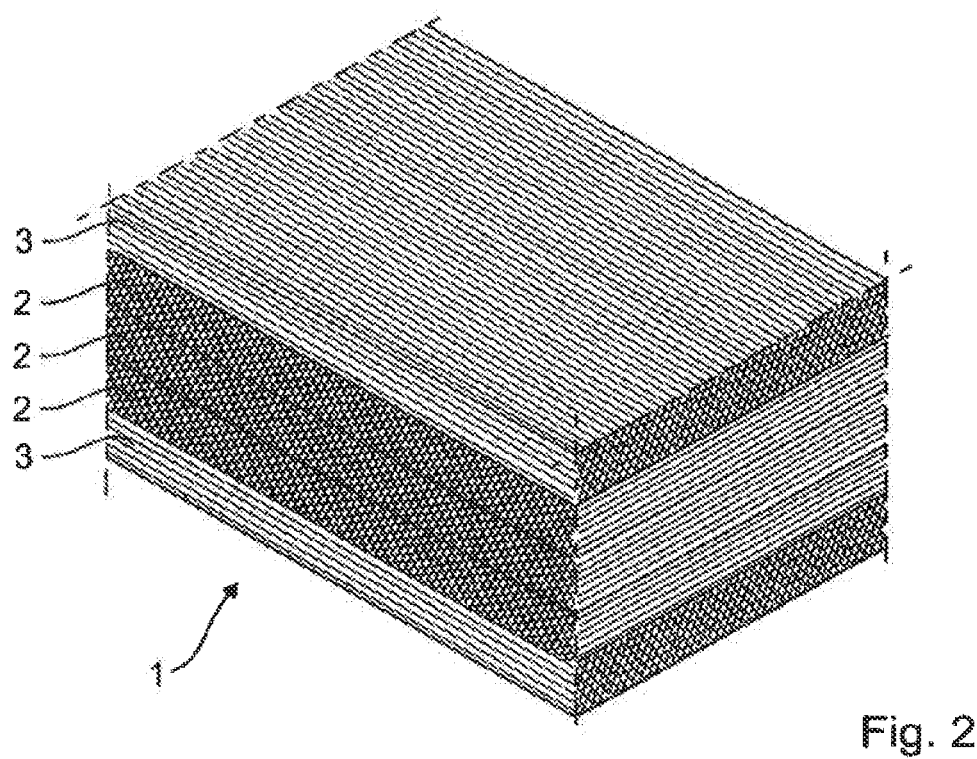
Figure 3A:
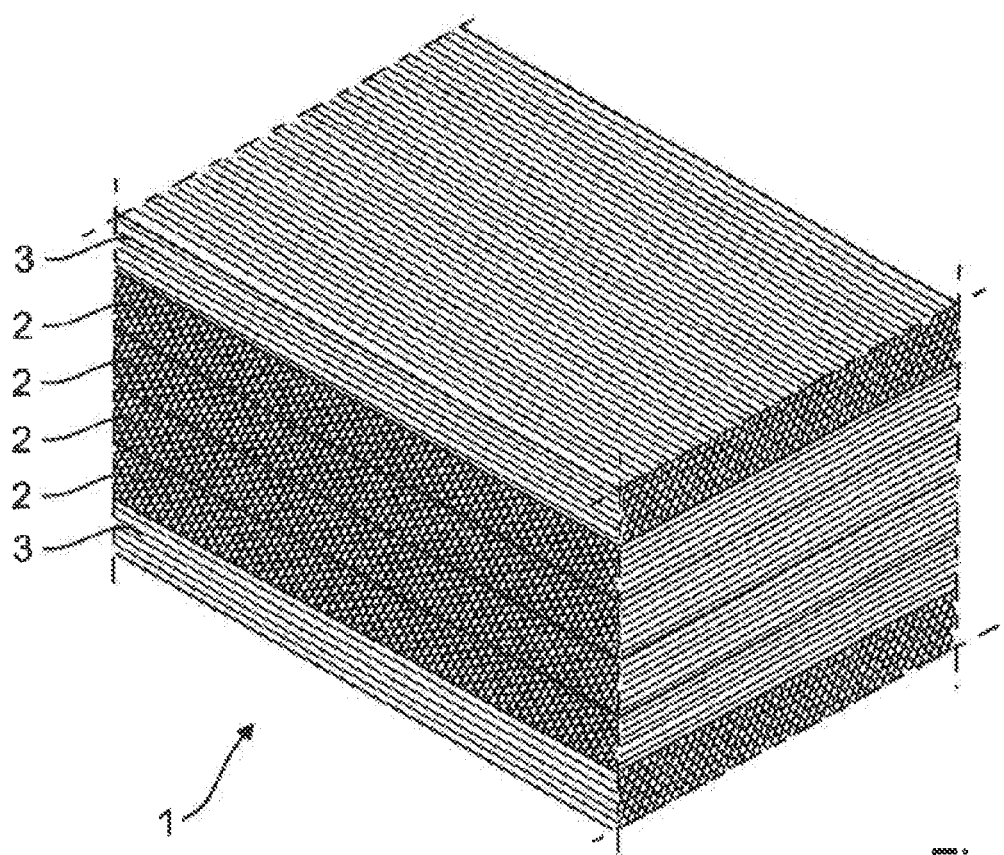
Figure 3B:
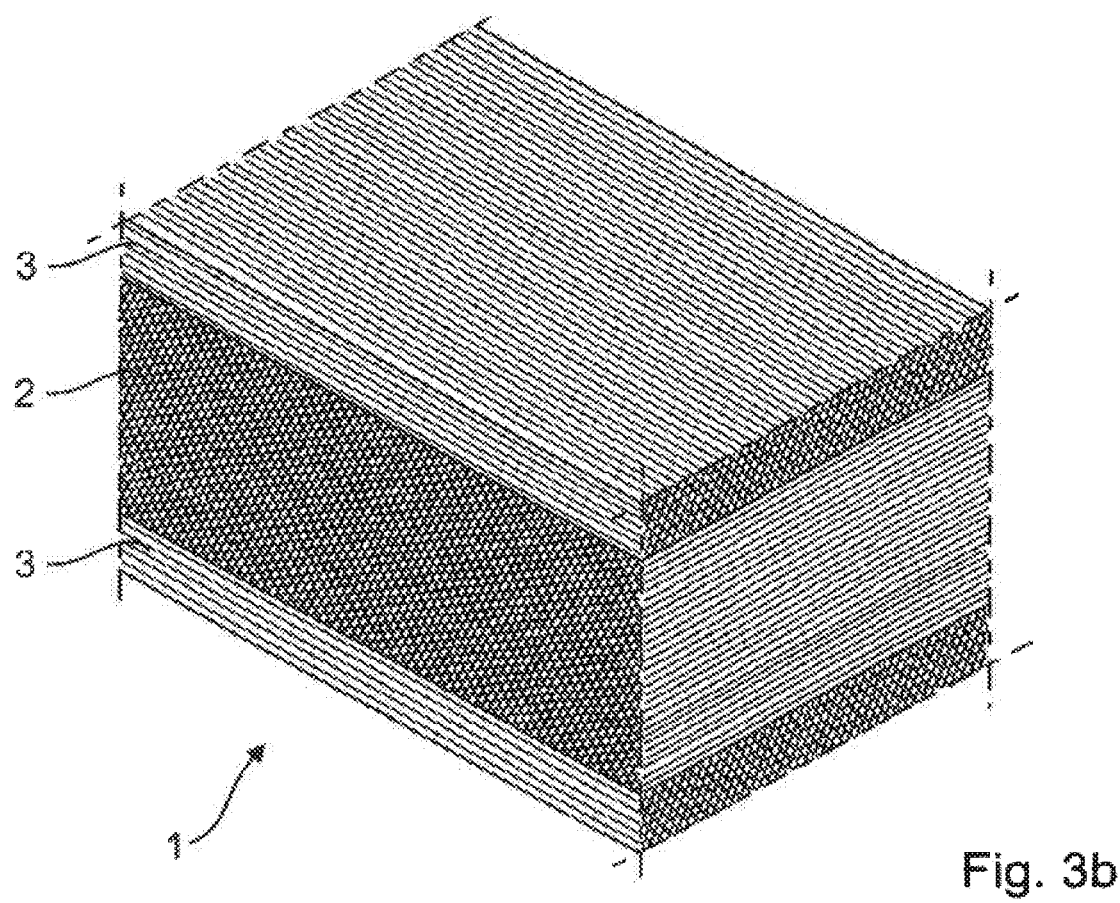
Figure 4A:
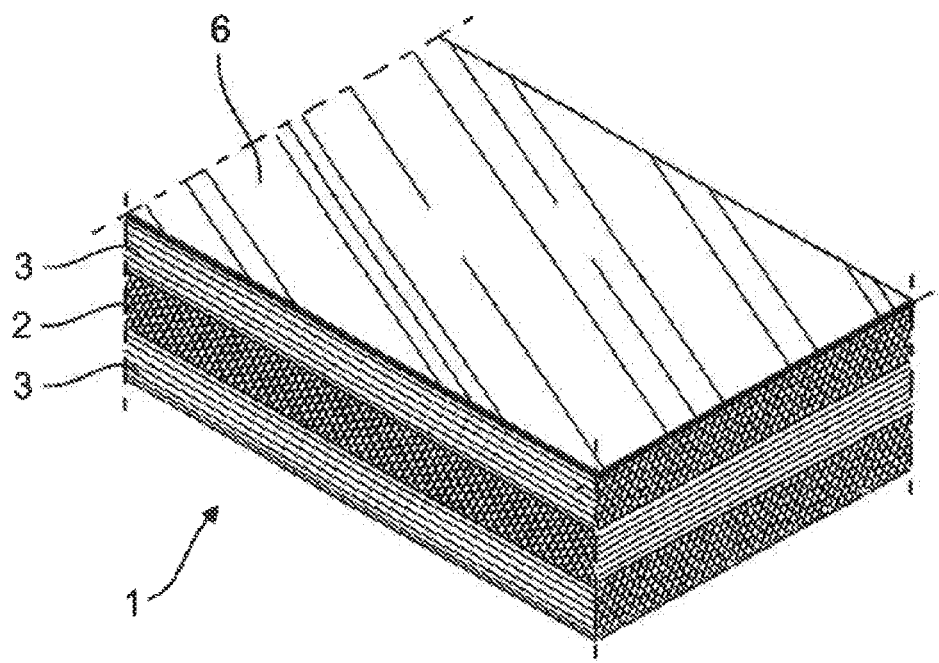
Figure 4B:
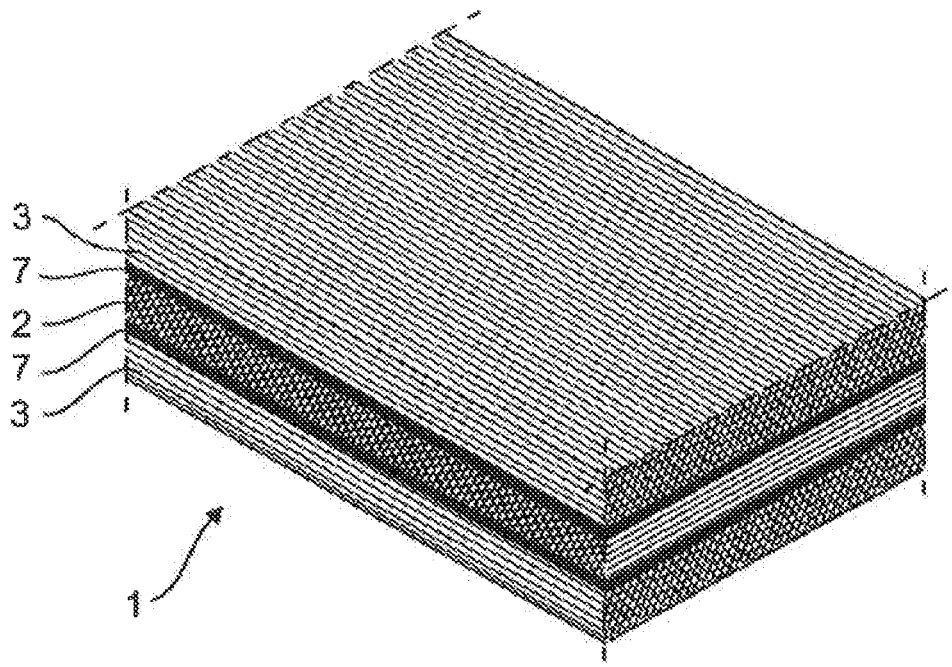

Further details and advantages of the invention will be apparent from the description which follows of the accompanying illustration showing preferred embodiments. The drawings show:

FIG. 1 shows a schematic and perspective depiction of a multilayer composite material made of three superposed layers of fibre composite material with enlarged detail, wherein the inner layer is rotated by 90° relative to the outer layers of fibre composite material, FIG. 2 shows a schematic and perspective depiction of a multilayer composite material made of five superposed layers of fibre composite material, wherein the inner layers have the same orientation and their orientations relative to the outer layers of fibre composite material are rotated by 90°, FIG. 3a shows a schematic and perspective depiction of a multilayer composite material made of six superposed layers of fibre composite material, wherein the inner layers have the same orientation and their orientations relative to the outer layers of fibre composite material are rotated by 90°, FIG. 3b shows a schematic and perspective depiction of a multilayer composite material made of three superposed layers of fibre composite material, wherein the inner layer has a greater thickness than the sum of the two outer layers. The thickness ratio of the inner layer to the sum of the two outer layers is the same as the thickness ratio of the sum of all inner layers to the sum of the two outer layers of the multilayer composite material from FIG. 3a, FIG. 4a shows a schematic and perspective depiction of a multilayer composite material made of three superposed layers of fibre composite material and an additional material layer on an outer layer of fibre composite material, FIG. 4b shows a schematic and perspective depiction of a multilayer composite material made of three superposed layers of fibre composite material and two additional inner further material layers, for example plastic layers, wherein an inner further material layer is located between each outer layer of fibre composite material and the inner layer of fibre composite material.

FIG. 1 shows a portion of a multilayer composite material 1 made of three superposed layers of fibre composite material 2, 3, wherein the inner layer of fibre composite material 2 is rotated by 90° relative to the outer layers 3 of fibre composite material. The enlarged detail in FIG. 1 shows that each of the layers 2, 3 of the multilayer composite material comprises endless fibres 4 which are unidirectionally aligned within the respective layer and are embedded in polycarbonate-based plastic 5. The orientation of the respective layer of fibre composite material 2, 3 is determined by the orientation of the unidirectionally aligned endless fibres 4 present therein. The endless fibres 4 extend over the entire length/width of the multilayer composite material. The layers 2, 3 are uniformly interjoined.

The multilayer composite material 1 as per FIG. 2 is made of five superposed layers of fibre composite material 2, 3, wherein the inner layers of fibre composite material 2 have the same orientation and their orientation relative to the outer layers of fibre composite material 3 are rotated by 90°.

The multilayer composite material 1 as per FIG. 3a is made of six superposed layers of fibre composite material 2, 3, wherein the inner layers of fibre composite material 2 have the same orientation and their orientation relative to the outer layers of fibre composite material 3 are rotated by 90°.

FIG. 3b shows a multilayer composite material 1 made of three superposed layers of fibre composite material 2, 3, wherein the inner layer 2 has a greater thickness than the sum of the two outer layers 3. FIG. 4a shows the multilayer composite material 1 made of three superposed layers of fibre composite material 2, 3 as described for FIG. 1 but with an additional further outer material layer 6 atop one of the outer layers of fibre composite material 3. The outer material layer 6 may for example comprise one or more fibre-free plastic layers and/or a thin facing, for example a paint layer or a veneer.

FIG. 4b shows a multilayer composite material 1 made of three superposed layers of fibre composite material 2, 3 as described for FIG. 1 but with two additional further inner material layers 7, wherein a respective inner further material layer 7 is located between one of the outer layers 3 of fibre composite material and the inner layer 2 of fibre composite material respectively. The further inner material layers 7 may have an identical or different construction and may comprise for example one or more fibre-free plastic layers.

WORKING EXAMPLES

There follows a detailed description of the invention with reference to working examples, and the methods of determination described here are employed for all corresponding parameters in the present invention, in the absence of any statement to the contrary.

Preparation of the Block Cocondensate

Starting Materials:
Polycarbonate:

The starting material used for the reactive extrusion is linear bisphenol A carbonate having end groups based on phenol with a melt volume index of 59-62 cm³/10 min (measured at 300° C. with load 1.2 kg according to ISO 1133 (2011)). This polycarbonate does not contain any additives such as UV stabilizers, demoulding agents or thermal stabilizers. The polycarbonate was prepared via a melt transesterification process as described in DE 102008019503. The polycarbonate has a content of phenolic end groups of about 600 ppm.

Siloxane Block:

Hydroquinone-terminated polydimethylsiloxane of the formula (11) with n of about 20 and m in the range from 3 to 4 in formula (2) ($R^1$=H, $R^2$=methyl), with a hydroxyl content of 22.2 mg KOH/g and a viscosity of 175 mPa·s (23° C.); the sodium content is about 3 ppm. The siloxane contains about 3% by weight of isooctanol.

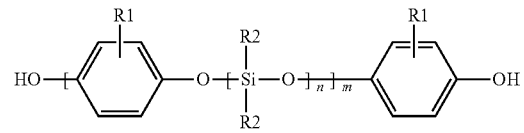

Catalyst:

The catalyst used is tetraphenylphosphonium phenoxide from Rhein Chemie Rheinau GmbH (Mannheim, Germany) in the form of a masterbatch. Tetraphenylphosphonium phenoxide is used in the form of cocrystals with phenol and contains about 70% tetraphenylphosphonium phenoxide. The amounts which follow are based on the substance obtained from Rhein Chemie (as cocrystals with phenol).

The masterbatch is produced as a 0.25% mixture. For this purpose, 18 g of tetraphenylphosphonium phenoxide are spun onto 4982 g in a drum hoop mixer for 30 minutes. The masterbatch is metered in in a ratio of 1:10, such that the catalyst is present with a proportion of 0.025% by weight in the overall amount of polycarbonate.

MVR

Unless stated otherwise, the melt volume flow rate (MVR) is determined according to ISO 1133 (2011) (at 300° C.; 1.2 kg), unless any other conditions are stated.

Solution Viscosity

Determination of solution viscosity: Relative solution viscosity (ηrel; also referred to as eta rel) was determined in dichloromethane at a concentration of 5 g/l at 25° C. with an Ubbelohde viscometer.

Sodium Content

The sodium content is determined via mass spectrometry with inductively coupled plasma (ICP-MS).

The block cocondensate is prepared from the polycarbonate component and the siloxane component via a reactive extrusion process according to WO2015/052110 A1.

FIG. 1 of WO 2015/052110 A1 shows a scheme for preparation of the siloxane-containing block cocondensates. Polycarbonate and a catalyst masterbatch are metered via the gravimetric feeds (4) and (5) into the twin-screw extruder (1). The extruder (ZSE 27 MAXX from Leistritz Extrusionstechnik GmbH, Nuremberg) is a co-rotating twin-screw extruder with vacuum zones for removal of the vapours. The extruder consists of 11 housing parts. In housing part 1 the polycarbonate and catalyst masterbatch are added, and in housings 2 and 3 these components are melted. In housing part 4 the liquid silicone component is added. Housing parts 5 and 6 serve for mixing-in of the liquid silicone component. Housings 7 to 10 are provided with venting orifices in order to remove the condensation products. Housings 7 and 8 are assigned to the first and housings 9 and 10 to the second vacuum stage. The vacuum in the first vacuum stage is between 250 and 500 mbar absolute pressure. The vacuum in the second vacuum stage is less than 1 mbar. The siloxane is initially charged in a tank and introduced into the extruder via a metering pump. The vacuum is generated by means of 2 vacuum pumps. The vapours are guided away from the extruder and collected in 2 condensers. The melt that has been degassed in this way is guided via a conduit from the twin-screw extruder to a high-viscosity reactor.

The high-viscosity reactor is a self-cleaning apparatus having two co-rotating rotors arranged in a horizontal and axially parallel manner. The construction is described in European patent application EP460466; see FIG. 7 therein. The machine used has a rotor diameter of 187 mm with a length of 924 mm. The overall interior of the reactor has a volume of 44.6 litres. The high-viscosity reactor is likewise connected to a vacuum pump (8) and to a condenser (9). The vacuum applied in the high-viscosity reactor is 0.1 to 5 mbar. In conclusion of the reaction, the block cocondensate is removed via a discharge screw and subsequently pelletized (via waterbath (10) and pelletizer (11)). The molecular weight of the block cocondensate is controlled via the throughput. The throughput in the extruder/high-viscosity reactor combination is adjusted so as to give a solution viscosity of the block cocondensate of about eta rel 1.31.

The block cocondensate has an MVR of 6.3 $cm^3/10$ min.
The block cocondensate has a sodium content of 140 ppb.
Materials for Comparative Examples:
Makrolon® 3108 (linear bisphenol A-based polycarbonate) from Covestro Deutschland AG with an MVR of 6 $cm^3/10$ min.
Makrolon® 2608 (linear bisphenol A-based polycarbonate) from Covestro Deutschland AG with an MVR of 12 $cm^3/10$ min.

Production of the Multilayer Composite Material:

The respective pelletized material is dried at 110° C. for 4 hours and is then processed by means of a single-screw extruder (Kuhne (model: K35-24D), extruder speed 40 rpm; extruder melt temperature of about 250° C.) with a slot die (slot film die 450 mm; lip gap 0.8 mm; casting role takeoff 130° C.; chill role takeoff 130° C.; takeoff speed about 3 m/min) to give films of thickness about 130 μm. These films were then processed further to give composite sheets by the film stacking method according to the process parameters specified below in a static press of the Organo Presse LAP 100 type from Gottfried Joos Maschinenfabrik GmbH. For production of the composite sheets, glass fibre weaves from Schlösser & Cramer K G (Haan, Germany) of the Style 3107 type with a K506 finish were used. The weaves have a basis weight of 390 $g/m^2$ with a 2/2 twill weave. Films and weave layers were layered alternately, with the upper and lower faces of the composite sheet each concluded by a film layer. A total of 5 films of substrate material were laid alternately with 4 glass fibre weave mats, such that the warp direction remains the same. The materials are pressed at a constant pressure of 12 bar, with the temperature between 280 and 295° C.

Example 1 (Comparative)

The multilayer composite material is produced using Makrolon 2608. The material is extruded as described above to give films and processed further to give the multilayer composite.

Example 2 (Comparative)

The multilayer composite material is produced using Makrolon 3108. The material is extruded as described above to give films and processed further to give the multilayer composite.

Example 3 (Inventive)

The multilayer composite material is produced using siloxane-containing block cocondensate which has been produced as described above. The material is extruded as described above to give films and processed further to give the multilayer composite.

Example 4 (Inventive)

The multilayer composite material is produced using siloxane-containing block cocondensate which has been produced as described above. By means of compounding, 1% titanium dioxide (Kronos 2230 from Kronos Worldwide Inc.) and 0.2% Lotader 8900 from Arkema are also added to this siloxane-containing block cocondensate for colouring. The material has an MVR of 6.6.

Bending Test:

Bars are sawn out of the composite sheets. The long side of the specimen is in warp direction. The cut specimens (about 80×20 mm) were clamped into the templates at an edge fibre elongation at about 0.96% and left therein for 24 h. This was followed by the evaluation of the defects as described below.

Evaluation of the Surface Defects by Means of Light Microscopy:

The light microscope images (transmitted light; bright field) were each taken on a piece of length about 2 cm (from the edge to the middle) and a piece (about 1 cm) directly from the middle. The images for all three samples show cracks running vertically and also horizontally. The evaluation considers the cracks that run vertically, i.e. the cracks that run at right angles to the long side (warp direction) of the test specimen.

TABLE 1

Cracks in the edge/middle region

|  | Example 1 C | Example 2 C | Example 3 I |
|---|---|---|---|
| Cracks (number) | 33 | 29 | 12 |
| Crack length (cm) | 2.2 | 2.2 | 2.2 |

TABLE 2

Cracks in the middle/middle region

|  | Example 1 C | Example 2 C | Example 3 I |
|---|---|---|---|
| Cracks (number) | 9 | 10 | 4 |
| Crack length (cm) | 1.0 | 1.0 | 1.0 |

Melt Stability:

|  | Ex. 3 I | Ex. 4 I | Ex. 1 C | Ex. 2 C |
| --- | --- | --- | --- | --- |
| MVR 300° C./5 min | 6.3 | 6.6 | 11.1 | 5.7 |
| MVR 300° C./20 min | 6.4 | 6.6 | 11.0 | 5.7 |
| MVR 300° C./30 min | 6.3 | 6.6 | 11.4 | 5.7 |
| MVR 320° C./5 min | 10.6 | 11.5 | 19.5 | 10 |
| MVR 320° C./20 min | 10.5 | 11.3 | 19.9 | 10.1 |
| MVR 320° C./30 min | 10.5 | 11.3 | 20.0 | 9.8 |

The symbols mean: C=comparative, I=inventive

The substrate materials for the multilayer bodies according to the invention exhibit exceptionally high melt stability and are thus especially suitable for processing to give the multilayer bodies according to the invention. It is surprising that a siloxane-containing block cocondensate prepared by the reactive extrusion process has a similar or even higher melt stability compared to a conventional polycarbonate prepared by the interfacial process. In spite of the unusually high sodium value of the block cocondensate, it is surprising that the material has such high melt stability.

Computer Tomography:

Test specimens are examined by a bending cycle test by means of computer tomography. For this purpose, the Empyrian instrument from Panalytical is used. The samples are illuminated with Cu—Kα radiation and a tomogram is created. The sample is rotated in (fractions of a) degree steps in a direction of orientation of the glass fibre fabric (about 900 images). The tomogram is the three-dimensional representation of the density distribution of the components in the sample (glass fibre weave, matrix, voids). The contrast in the images correlates with the density. Black regions have the lowest density (correlating with voids) and light regions (glass fibre weave) have the highest density. With the aid of the individual images, a three-dimensional representation of the density distribution (software: VG Studio from Volume Graphics, Heidelberg) is created; the volume of the pores (volume of air) is ascertained from the three-dimensional representation of the CT via the grey value assigned thereto, Bending Cycle Test:

Bars of width 0.5 cm were sawn out of the multilayer bodies of Examples 1 to 4. These rods were clamped and bent 10 times to each side, and then the computer tomogram of the sample was created as described above and analysed as described above, and the volume of the voids formed was examined.

|  | Measurement 1 | | | Measurement 2 | | |
| --- | --- | --- | --- | --- | --- | --- |
|  | Volume$_{total}$ | Volume$_{air}$ | % age$_{air}$ | Volume$_{total}$ | Volume$_{air}$ | % age$_{air}$ |
| Ex. 1C | 15.27 mm$^3$ | 1.12 mm$^3$ | 7.30% | 14.81 mm$^3$ | 3.05 mm$^3$ | 20.60% |
| Ex. 2C | 18.72 mm$^3$ | 2.27 mm$^3$ | 12.10% | 20.11 mm$^3$ | 1.90 mm$^3$ | 9.40% |
| Ex. 3I | 20.39 mm$^3$ | 0.56 mm$^3$ | 2.70% | 13.87 mm$^3$ | 0.55 mm$^3$ | 4.00% |
| Ex. 4I | 18.83 mm$^3$ | 0.41 mm$^3$ | 2.20% | 18.38 mm$^3$ | 1.37 mm$^3$ | 7.50% |

The CT images and the volume evaluation of the voids show that the samples from Comparative Examples 1 and 2 have greater voids after the bending cycle test than the samples from Inventive Examples 3 and 4. In the case of the samples from Examples 1 and 2, the proportion of voids formed is about 12.4%, whereas the inventive examples surprisingly have an average proportion of 4.1%.

The invention claimed is:

1. A fibre composite material comprising at least one layer of fibre material, wherein the fibre materials are selected from glass fibres and/or carbon fibres as endless fibres or in the form of weaves and knits, embedded into a thermoplastic based on siloxane-containing block cocondensate, wherein the siloxane block has the following structure (4)

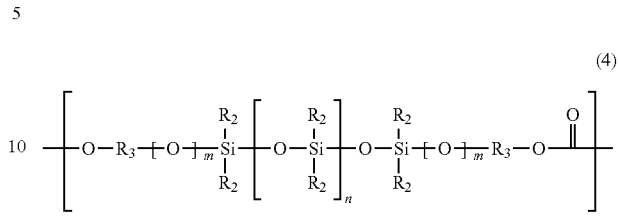

where R2 is independently a linear or branched aliphatic radical, or a substituted or unsubstituted aromatic radical, n is 1 to 150, and m is 0 or 1, R3 independently includes the following structure (5)

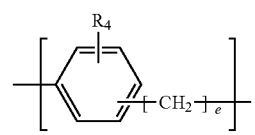

where R4 is independently hydrogen, halogen and/or in each case a C1 to C10, linear or branched, unsubstituted or mono- to tetrasubstituted alkyl radical or alkoxy radical, and e is a natural number from 2 to 12, or R3 is derived from hydroquinone, a substituted hydroquinone radical or a structural element of the formula (6)

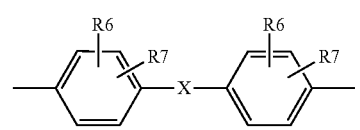

where R6 and R7 are independently H, C1-C18-alkyl, C1-C18-alkoxy, halogen such as Cl or Br or in each case optionally substituted aryl or aralkyl, preferably independently H or C1-C12-alkyl, and X is —CO—, —O—, —S—, C1- to C6-alkylene, C2- to C5-alkylidene, C6 to C10-cycloalkylidene or C6- to C12-arylene which may optionally be fused to further aromatic rings containing heteroatoms.

2. A multilayer composite material comprising at least two mutually superposed layers of fibre composite material according to claim 1, wherein, in the case of three composite material layers, these are defined relative to one another as two outer layers of fibre composite material and at least one inner layer of fibre composite material, wherein, in the case of endless fibres as fibre material, these are aligned unidirectionally in the respective layer.

3. The multilayer composite material according to claim 2, wherein the inner layers of fibre composite material have substantially the same orientation and their orientation is rotated by 30° to 90° relative to the outer layers of fibre composite material, wherein the orientation of one layer of

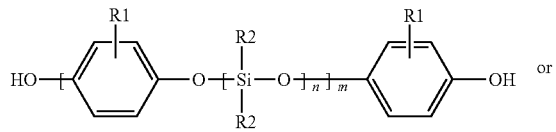

(11)

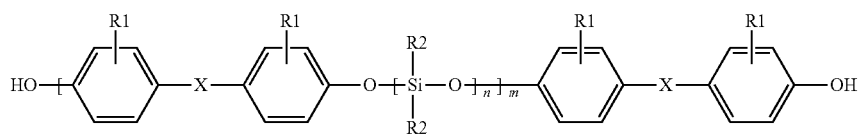

(12)

fibre composite material is determined by the orientation of the unidirectionally aligned fibres present therein.

4. The multilayer composite material according to claim 2, wherein at least some of the layers have the same orientation and at least some other layers are rotated by 30° to 90° and the outer layers are in a 0° orientation relative thereto.

5. The multilayer composite material according to claim 2, wherein the inner layers have the same orientation and the orientation thereof is rotated by 30° to 90° relative to the outer layers of fibre composite material.

6. The multilayer composite material according to claim 2, wherein the fibre volume content of the outer layers of fibre composite material is not more than 50% by volume, based on the volume of the outer layers of fibre composite material.

7. A process for producing the multilayer composite material according to claim 2, comprising the following steps:

a) providing at least one inner layer of fibre composite material and two outer layers of fibre composite material, wherein the individual fibre composite material layers are produced by applying a molten siloxane-containing block cocondensate-based thermoplastic to a raw fibre belt preheated above the glass transition temperature of the siloxane-containing block cocondensate-based thermoplastic, with application under pressure-shear vibration, b) inserting the at least one inner layer of fibre composite material between the outer fibre composite material layers, the inner layers of fibre composite material having the same orientation and the orientation thereof being rotated by 30° to 90° relative to the outer layers of fibre composite material, c) bonding the layered layers of fibre composite material to give the multilayer composite material.

8. The fibre composite material according to claim 1, wherein the structure of formula (4) is derived from one of the following structure (11) or (12):

where
R1 is hydrogen, Cl, Br or C1-C4-alkyl,
R2 is aryl, or C1-C4-alkyl,
X is a single bond, —SO2-, —CO—, —O—, —S—, C1- to C6-alkylene, C2- to C5-alkylidene, or C6- to C12-arylene which may optionally be fused to further aromatic rings containing heteroatoms, or C6-C12 cycloalkylidene,
n is an average number from 1 to 300 and
m is an average number from 1 to 10.

9. The fibre composite material according to claim 1, wherein, for the construction of the siloxane-containing block cocondensate, the siloxane block has a molecular weight of 3000 to 20 000 g/mol.

10. A housing part or component obtained from the fibre composite material according to claim 1.

11. A fibre composite material comprising at least one layer of fibre material, wherein the fibre materials are selected from glass fibres and/or carbon fibres as endless fibres or in the form of weaves and knits, embedded into a thermoplastic based on siloxane-containing block cocondensate, wherein the siloxane block has the following structure (10)

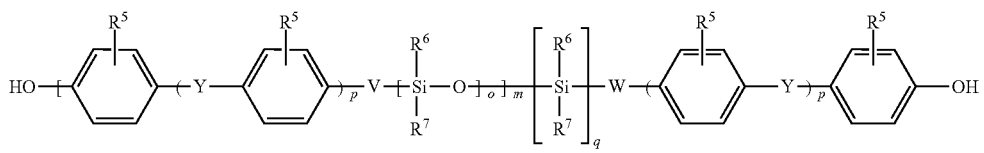

(10)

where
R5 is hydrogen or methyl,
R6 and R7 are independently methyl,
V is a single bond, O, C1 to C6-alkyl or C1 to C6-alkoxy,
W is a single bond, C1 to C6-alkylene, C2- to C5-alkylidene or C1 to C6-alkoxy,
Y is a single bond, —CO—, —O—, C1- to C6-alkylene, C2 to C5-alkylidene, a C5 to C6-cycloalkylidene radical which may be mono- or polysubstituted by C1 to C4-alkyl, or C6 to C12-arylene which may be fused to a further aromatic ring containing heteroatoms,
m is an average number of repeat units from 1 to 6,
o is an average number of repeat units from 10 to 400, and
p and q are each 0 or 1.

* * * * *